March 11, 1969 G. J. FAN 3,432,837

SENSOR MAGNETIC HEAD WITH MAGNETIC MATERIAL AS A GAP BRIDGE

Filed Dec. 30, 1964

INVENTOR.
GEORGE J. FAN

BY Bernard N. Wiener

ATTORNEY

United States Patent Office 3,432,837

Patented Mar. 11, 1969

3,432,837

SENSOR MAGNETIC HEAD WITH MAGNETIC MATERIAL AS A GAP BRIDGE

George J. Fan, Ossining, N.Y., assignor to International Business Machines Corporation, Armonk, N.Y., a corporation of New York Filed Dec. 30, 1964, Ser. No. 422,239

U.S. Cl. 340—174.1 16 Claims

Int. Cl. G11b *5/30*

ABSTRACT OF THE DISCLOSURE

The disclosure provides a sensor for dynamic magnetic field patterns. A particular sensor for magnetic field patterns is a magnetic head which has a discontinuity or gap in its reading face that is placed adjacent a flexible record medium with magnetic field patterns thereon which are to be read, e.g., magnetic tape. The magnetic head of this invention has a layer of magnetic material on its reading face bridging the gap with permeability less than the magnetic material of the head and coercivity less than that of the record. There is a cooperation of the magnetic layer with the magnetic tape to obtain a flux concentration in the reading coil of the magnetic head.

This invention relates generally to magnetic heads for information handling with a magnetic record medium and it relates more particularly to a magnetic head which has a layer of material thereon which participates beneficially in the retrieval of information stored as magnetic field patterns by a flexible magnetic record medium.

In the prior art of information retrieval from a flexible magnetic record storage medium with a magnetic head sensor, there have been encountered problems of excessive wear of the record medium because of closeness of the sensor to the record medium during mechanical traversal. During the traversal, the magnetic head which has an inhomogeneous surface causes abrasions of the record medium surface and ultimately its destruction for practical purpose. A partial solution of the prior art has been to separate the head reading face from the record surface. However, the signal to noise ratio has been undersirably decreased whenever the magnetic head and record medium have been separated a distance to minimize the wear of the record medium. Heretofore, it has been suggested that the wear of the record medium could be improved if a layer of nonmagnetic material were established on the magnetic head surface which would be in contact with the record medium. However, in practical circumstance, the separation of the magnetic head from the record medium has still left the problem of a small signal to noise ratio due to the fact that the signal falls off exponentially with the increased separation between the head and the tape.

Thus, there has been the necessity for solution of the prior art problem concerning small signal to noise ratio. It would be advantageous to have a layer of material on the magnetic head face which would both minimize the wear of the magnetic record medium surface and enhance the signal to noise ratio. These requirements have previously been considered to be mutually exclusive objectives which would have to be balanced to accord to a practical circumstance.

It is the primary object of this invention to provide a magnetic head for handling of information as magnetic field patterns in a magnetic record medium which obtains a desirable wear property for the record medium and a large signal to noise ratio.

It is another object of this invention to provide a magnetic head for retrieval of information stored as magnetic field patterns in a flexible magnetic record medium which obtains a desirable wear property for the record medium and a large signal to noise ratio.

It is a further object of this invention to provide a magnetic material as a smooth surface layer on a sensor magnetic head to minimize mechanical wear resulting from the touching of the surface of flexible magnetic record medium and the reading face of the sensor head and to participate beneficially in the sensing process to improve the signal to noise ratio.

It is another object of this invention to provide a retrieval system for information stored as magnetic field patterns in which the sensor means has a layer of material established thereon across a sensing discontinuity which participates beneficially in transferring the induced magnetic field lines from the record medium through the sensor magnetic flux path.

It is another object of this invention to provide a sensor for magnetic field wherein the flux path of one magnetic material participates in transferring the magnetic field induced lines through the flux path of a second magnetic material.

It is another object of this invention to provide a transducer for information stored as magnetic field patterns in a record medium which optimizes the coupling of the magnetic field to a sensor means.

It is another object of this invention to control the coupling of magnetic field from a record medium to a sensor means by establishing at the sensor means a flux concentrating means for coupling the magnetic fields from the record medium to the sensor flux path.

The foregoing and other objects, features and advantages of the invention will be apparent from the following more particular description of a preferred embodiment of the invention, as illustrated in the accompanying drawings.

FIGURE 1 is a perspective view of a magnetic head in accordance with the principles of this invention shown adjacent a magnetic tape in reading position therewith and having on its reading face a layer of magnetic material which cooperates with the magnetic material of the head and that of the tape to obtain a flux concentration in the reading coil of the magnetic head.

FIGURE 2 presents illustrative hysteresis curves for the laminations of the magnetic head, the magnetic layer thereon, and the magnetic tape illustrating their different B and H properties.

Figures 1, 2, 3, 4:
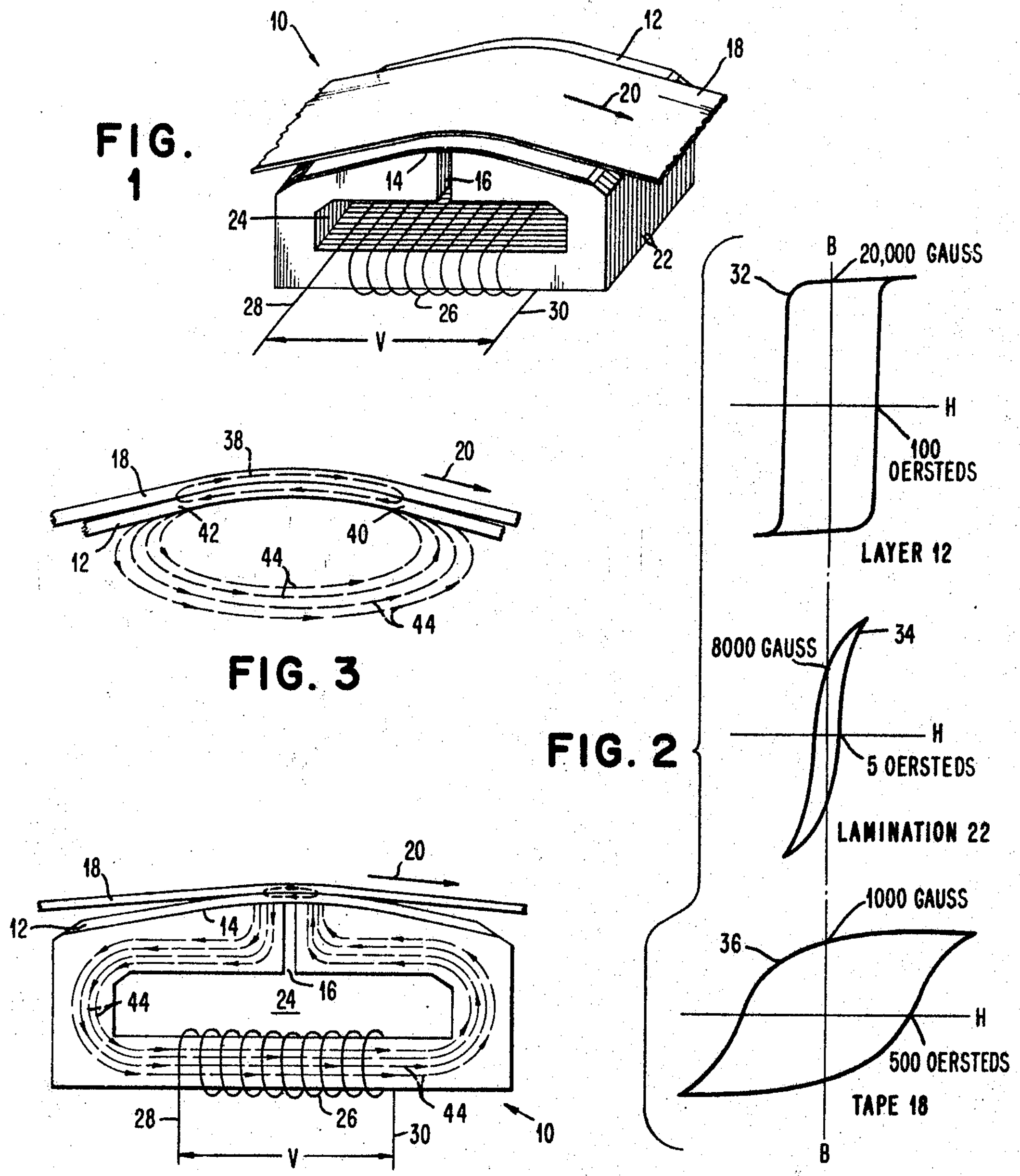
FIGURE 3 is a fragmentary line drawing showing a portion of a magnetic tape and a portion of a magnetic layer utilized on the reading face of a magnetic head and illustrates the manner in which the magnetic layer obtains increased flux concentration.
FIGURE 4 is a line drawing illustrating the manner in which the increased flux concentration obtained by the magnetic layer of FIGURE 3 increases the number of flux lines threading the reading coil of the magnetic head.

The invention provides a sensor for dynamic magnetic field patterns. A particular sensor for magnetic field patterns is a magnetic head which has a discontinuity or gap in its reading face that is placed adjacent a flexible record medium with magnetic field patterns thereon which are to be read. The magnetic head of this invention has a layer of magnetic material on its reading face bridging the gap with permeability less than that of the head and coercivity less than that of the record. There is a cooperation of the magnetic layer with the magnetic tape to obtain a flux concentration in the reading coil of the magnetic head.

In FIGURE 1, a magnetic head 10 has magnetic layer 12 on its reading face 14 bridging the gap therein 16. Adjacent to and continuous with the magnetic layer 12 where it bridges the gap 16 is a flexible record medium 18, e.g., a magnetic tape, which has a magnetic field pattern impressed on its surface adjacent the layer 18. Magnetic tape 18 is driven by a source of mechanical power, not shown, indicated generally by arrow 20. The magnetic head 10 is constructed of a series of laminations 22 with insulation therebetween to minimize eddy current losses in the transverse direction. Orifice 24 within magnetic head 10 is threaded by read coil 26 with terminal lines 28 and 30 on which an output voltage V is obtained for a detector, not shown, from flux established transiently in layer 12.

The hysteresis curves 32, 34, and 36 shown in FIG. 2 are for the magnetic layer 12, laminations 22 of head 10 and magnetic tape 18, respectively. It should be noted that the curves 32, 34 and 36 have different B and H scales. The hysteresis curves 32, 34, and 36 of FIG. 2 are indicative of the requirements for the practice of this invention that the permeability of the magnetic film 12 be much smaller than that of the laminations 22 of the head 10 and have a coercivity much less than that of the magnetic material of the tape 18.

Illustratively, the plated magnetic material of tape 18 may have a surface remanence and coercivity considerably in excess of 300 oersted and the laminations 22 of head 10 have a permeability of approximately 1000 units at high frequency. There are many magnetic films such as NiFe, CoNi, and Fe which satisfy the magnetic requirements of magnetic layer 12. It is convenient to establish the layer 12 on the surface 14 of head 10 by conventional electroplating technique.

It is desirable that the thickness of magnetic layer 12 be relatively thin compared with the length of the region of tape 18 utilized to store a bit, e.g., of the order of one micron. For a magnetic layer 12 thickness of one micron and a bit length of approximately three microns, the demagnetization field which reduces the amplitude of the retrieved signal is essentially negligible.

An explanation of the manner in which the magnetic layer 12 obtains the flux concentration in magnetic head 10 so that an increased voltage output signal is obtained on terminal lines 28 and 30 of output coil 26 will be discussed with reference to FIGURES 3 and 4 under the assumption that the permeability of the layer 12 is higher than the permeability of the tape 18. With reference to the fragmentary view of FIGURE 3, it is contemplated that the magnetic tape 18 provides an exemplary magnetic flux line 38 which threads magnetic layer 12 establishing therein magnetic poles S and N at ends 40 and 42, respectively. Because the magnetic layer 12 has higher permeability than magnetic tape 18 there are a plurality of magnetic lines 44 emanating from layer 12 as compared with the single line 38 which enters it.

In FIG. 4, the tape 18 and layer 12 are shown in somewhat exaggerated form with relationship to the magnetic head 10. The magnetic lines 44 thread the reading coil 26 and obtain a substantially larger output signal voltage V on terminal lines 28 and 30 than would have been obtained if the magnetic layer 12 were replaced by a nonmagnetic layer of the same thickness. Had the magnetic tape 18 been removed from the gap 16 by a non-magnetic layer, in addition to the smaller signal because of the absence of the magnetic layer 12, there would also be an additionally diminished signal because fewer of the magnetic lines emanating from a particular bit stored in magnetic tape 18 would be available to thread read coil 26 of magnetic head 10.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. A sensor magnetic head having a magnetic field translating surface comprising:
- a first magnetic flux path in said head with a magnetic discontinuity therein, said flux path having a conductive coil thereon; and
- a second magnetic thin layer flux path as part of said head on said surface bridging said discontinuity outside of said discontinuity and having permeability less than the magnetic material of said first flux path.

2. The magnetic head of claim 1 in which said discontinuity is a gap.

3. In a sensor magnetic head with a magnetic discontinuity in a magnetic field translating surface thereof;
- a thin layer of magnetic material on said surface as part of said head and bridging said discontinuity outside of said discontinuity and having permeability less than the magnetic material of said magnetic head.

4. The magnetic head of claim 3 wherein said discontinuity is a gap.

5. A sensor magnetic head comprising:
- a first magnetic flux path in said head with a gap in a surface thereof; and
- a thin film of magnetic material as part of said head on said surface bridging said gap outside of said gap and having permeability less than said first path.

6. The magnetic head of claim 5 in which said film is of NiFe.

7. The magnetic head of claim 5 in which said film is Co.

8. The magnetic head of claim 5 in which said film is of CoNi.

9. The magnetic head of claim 5 in which said film is of Fe.

10. A sensor magnetic head comprising:
- a plurality of magnetic laminations with insulation therebetween in said head forming a magnetic flux path with a magnetic field translating surface therein having a gap therein;
- a conductive coil on said flux path; and
- a thin layer of magnetic material on said surface as part of said head and bridging said gap outside of said gap, said layer of magnetic material having a permeability less than the magnetic material of said flux path.

11. A sensor for magnetic field patterns having a magnetic field translating surface having a magnetic discontinuity therein comprising:
- a thin layer of magnetic material on said surface as part of said sensor and bridging said discontinuity outside of said discontinuity having relatively low permeability; and
- a conductive coil in flux threading relationship with said layer to obtain an output voltage when magnetic field is established transiently in said layer.

12. A sensor magnetic head for magnetic field patterns having a magnetic field translating surface comprising:
- means as part of said sensor having a magnetic path with a manetic discontinuity therein and a conductive coil around said path; and
- a thin layer of magnetic material with permeability less than said path on said means on said surface and bridging said discontinuity outside of said discontinuity as part of said sensor to concentrate magnetic flux in said path in said coil, said coil providing an output voltage when magnetic flux is established transiently in said layer.

13. In an information handling system wherein information is stored as magnetic field patterns in a flexible record medium;
- a sensor magnetic head with a magnetic discontinuity in the flux path thereof and a magnetic field translating surface; and a thin layer of magnetic material on said surface said head as part thereof and bridging said magnetic discontinuity outside of said discontinuity and having a permeability less than said flux path of said head and a coercivity less than said flexible magnetic record medium to concentrate magnetic flux in said magnetic head flux path to link said conductive coil when magnetic flux is established transiently in said layer from said record medium.

14. In an information handling system wherein a source provides dynamic magnetic field patterns which are available for external sensing:

a magnetic head with a dynamic magnetic field sensing discontinuity therein in flux sensing relationship with said flux providing source at a magnetic field translating surface thereof, said magnetic head having a magnetic field sensing conductive coil thereon; and a thin layer of magnetic material on said head on said surface as part thereof and bridging said sensing discontinuity therein outside of said discontinuity and having a permeability less than said head and a coercivity less than the source of said dynamic magnetic flux to obtain a concentration of flux lines in said coil whereby an output voltage is obtained therefrom when dynamic magnetic flux from said flux source is established transiently in said layer.

15. In an information handling system;

a magnetic tape wherein information is stored in magnetic field patterns;

a magnetic head flux path having a magnetic discontinuity in a surface thereof facing said magnetic tape, said flux path having a conductive coil thereon, said coil having two terminals; and a thin layer of magnetic material on said surface as part of said head between said tape and said discontinuity and bridging said discontinuity outside of said discontinuity and having a permeability less than said head and coercivity less than said tape to concentrate magnetic flux lines in said coil when magnetic flux is established transiently in said layer by the relative movement of said magnetic tape and said surface to obtain an output voltage at said conductive coil terminals.

16. A sensor magnetic head comprising:

a first closed flux path for a first portion of said magnetic head including a magnetic discontinuity therein in a surface thereof; and a second closed flux path for a second portion of said magnetic head including a thin layer of magnetic material on said surface having permeability less than the magnetic material of said first portion and bridging said discontinuity outside of said discontinuity.

References Cited

UNITED STATES PATENTS

| | | | |
|---|---|---|---|
| 3,064,333 | 11/1962 | Kristiansen et al. | 179—100.2 |
| 3,314,056 | 4/1967 | Lawrance | 340—174.1 |
| 3,000,078 | 9/1961 | Emenaker et al. | 179—100.2 |
| 3,303,292 | 2/1967 | Bedell et al. | 340—174.1 |

OTHER REFERENCES

Stewart: Magnetic Recording Techniques, McGraw-Hill, 1958, p. 42.

BERNARD KONICK, *Primary Examiner.*

B. L. HALEY, *Assistant Examiner.*

U.S. Cl. X.R.

179—100.2